April 29, 1924.
C. P. ASTROM
PENSTOCK GATE
Filed Feb. 6, 1922
1,492,344
3 Sheets-Sheet 1
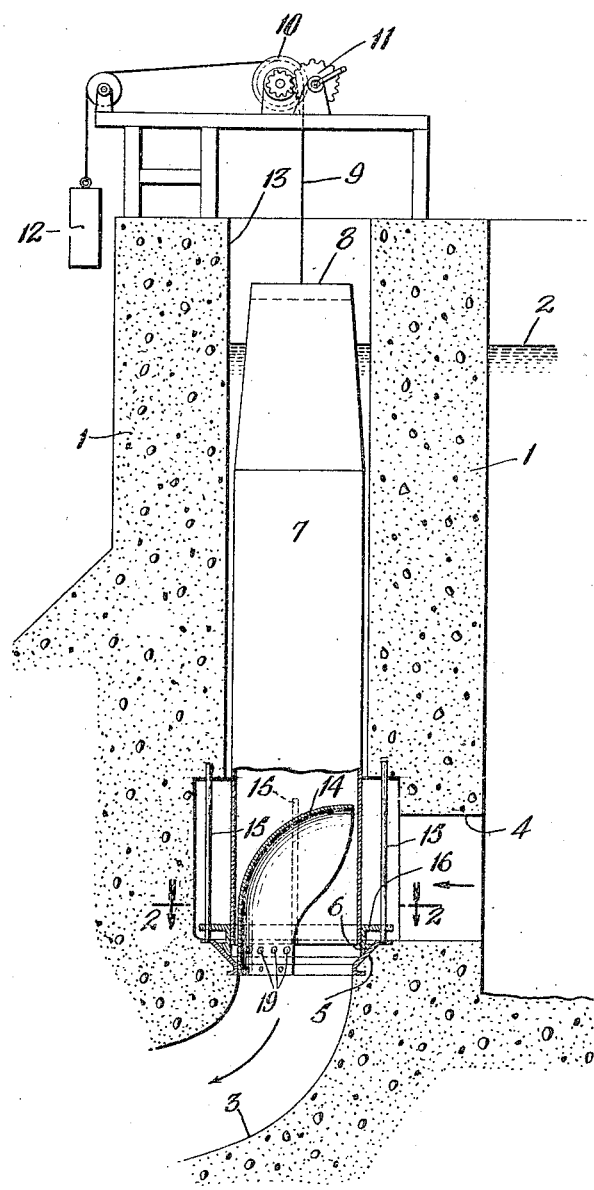
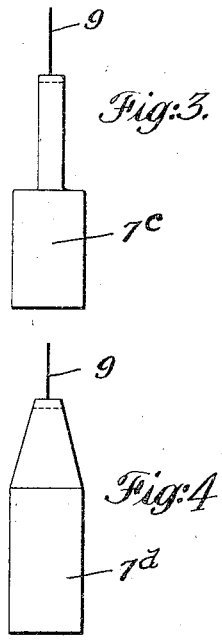
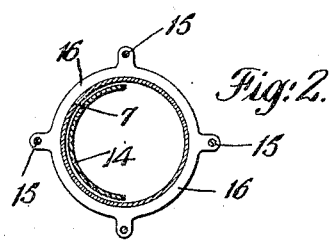
INVENTOR
Carl P. Astrom
BY
ATTORNEY April 29, 1924.
C. P. ASTROM
1,492,344
PENSTOCK GATE
Filed Feb. 6, 1922
3 Sheets-Sheet 2
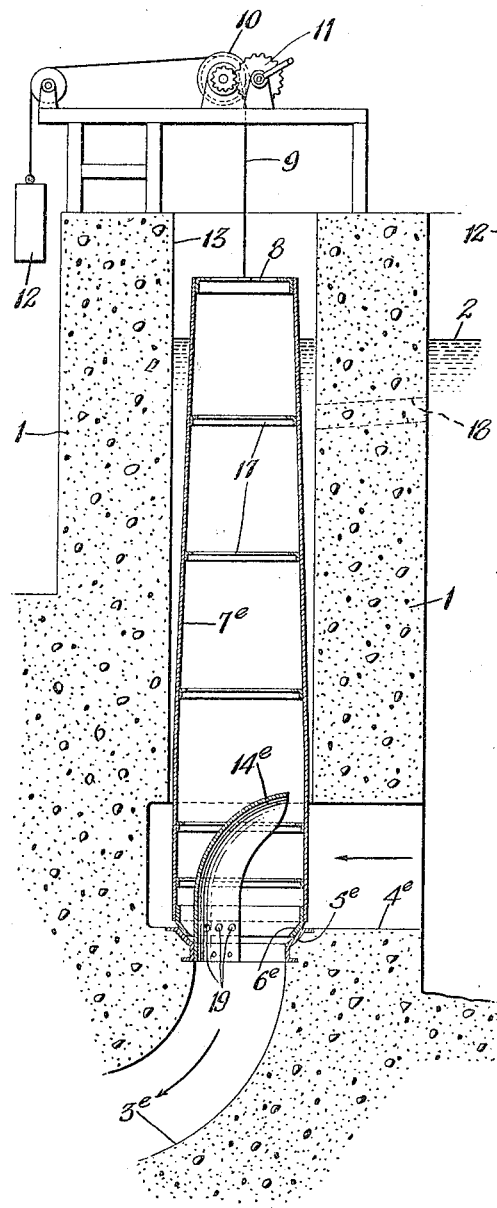
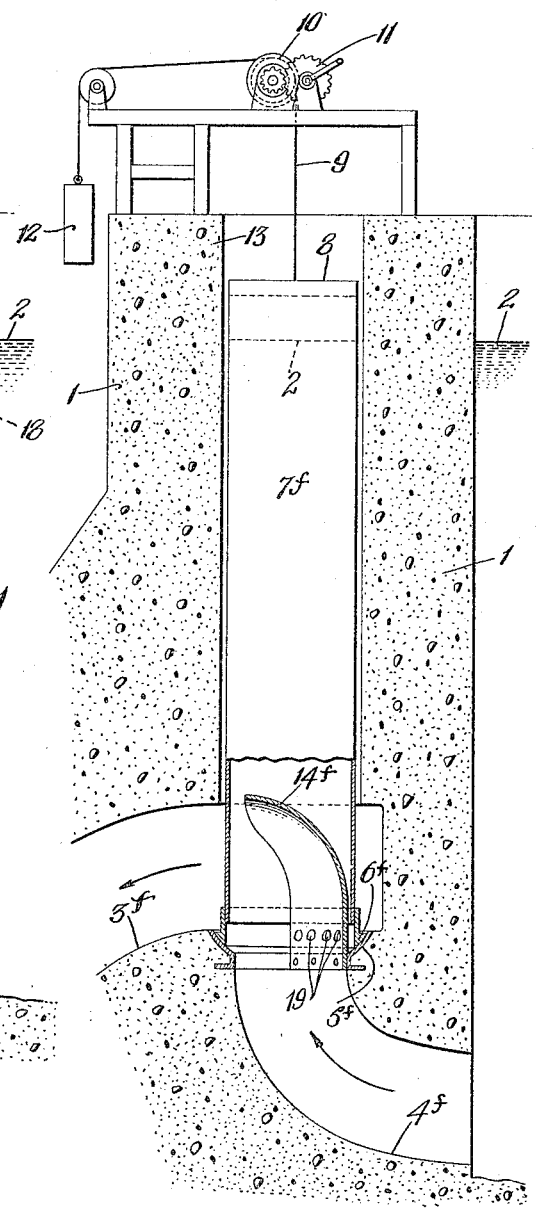
INVENTOR
Carl P. Astrom
BY
ATTORNEY April 29, 1924.

C. P. ASTROM 1,492,344

PENSTOCK GATE

Filed Feb. 6, 1922

INVENTOR
Carl P. Astrom
BY
ATTORNEY

Patented Apr. 29, 1924.

1,492,344

UNITED STATES PATENT OFFICE.

CARL P. ASTROM, OF EAST ORANGE, NEW JERSEY, ASSIGNOR TO M. H. TREADWELL COMPANY, A CORPORATION OF NEW YORK.

PENSTOCK GATE.

Application filed February 6, 1922. Serial No. 534,326.

*To all whom it may concern:*

Be it known that I, CARL P. ASTROM, a citizen of the United States, and a resident of East Orange, in the county of Essex and State of New Jersey, have invented certain new and useful Improvements in Penstock Gates, of which the following is a specification.

This invention relates to penstock gates and more particularly to a means for preventing the interference of water pressure with the operation of the gate, while at the same time providing a stream-line channel for the flow of water.

In carrying out my invention, I provide a seating surface around the penstock opening, and engaging said seating surface is a hollow or tubular gate or valve extending up above the water level into the atmosphere. The annular seating surface may be flat, or it may be either conical or spherical, or of other approved form, but the plane in which it is disposed should be substantially horizontal. Said gate may be raised and lowered to open and close the penstock to the reservoir, and when lowered to engage said seating surface it constitutes in effect a continuation of the penstock communicating with the atmosphere, thereby preventing any vacuum effect due to the weight or velocity of water in the penstock. The gate, if cylindrical, will not be subject to any vertical components of water pressure and the force required to unseat the gate will be no greater than the force required to raise it against gravity, which will be simply the weight of the gate itself modified as desired by an appropriate counterweight. If more positive seating is desired, the seating force may be made to exceed the lifting force to any desired extent by varying the shape of the gate member. By coning the latter so as to make it taper upwardly to a narrower cross section, the downward component of pressure on the exterior of the gate may be utilized to increase the seating force. In general the pressure effect will be exactly equal to the difference between the weight of water actually displaced by the gate and the weight of the column of water that would occupy the space directly over the covered area if the gate were to be removed. If the latter exceeds the former, the resultant force on the gate will be downward, tending to seat it, while if the former exceeds the latter, the resultant force will be upward. By properly designing the gate, therefore, the pressure effect may be predetermined to any desired amount or eliminated altogether.

A further advantage of coning the gate member resides in the fact that it facilitates disposal of ice, permitting the gate member to slip away from the same, ice formed outside the gate member being first loosened by the application of a torch or of steam from within the gate member.

In order to provide a stream-line channel for the flow, thereby preventing losses due to internal friction and to eddies, a curved deflecting surface or baffle is provided at the penstock opening and is continuous with the penstock. The baffle acts in some respects like an elbow connecting the penstock proper with the conduit leading to the reservoir. It is not quite continuous with the inlet conduit, sufficient clearance being provided to permit the gate member to come down over the same, and also to permit access of water around the gate member to provide equal static pressure on all sides of the same.

With this and other objects in view, I have devised the apparatus embodying my invention as described in the following specification and illustrated in the accompanying drawings, of which—

Figure 1 is a sectional elevation showing the gate in relation to the penstock and reservoir.

Figure 2 is a horizontal section taken on the line 2—2 of Figure 1;

Figures 3 and 4 show various forms of gate members;

Figure 5 is a view similar to Figure 1 showing an alternative form of seating member, Figure 6 is a view similar to Figure 1 showing a modified arrangement of penstock and intake conduit.

Figure 7:
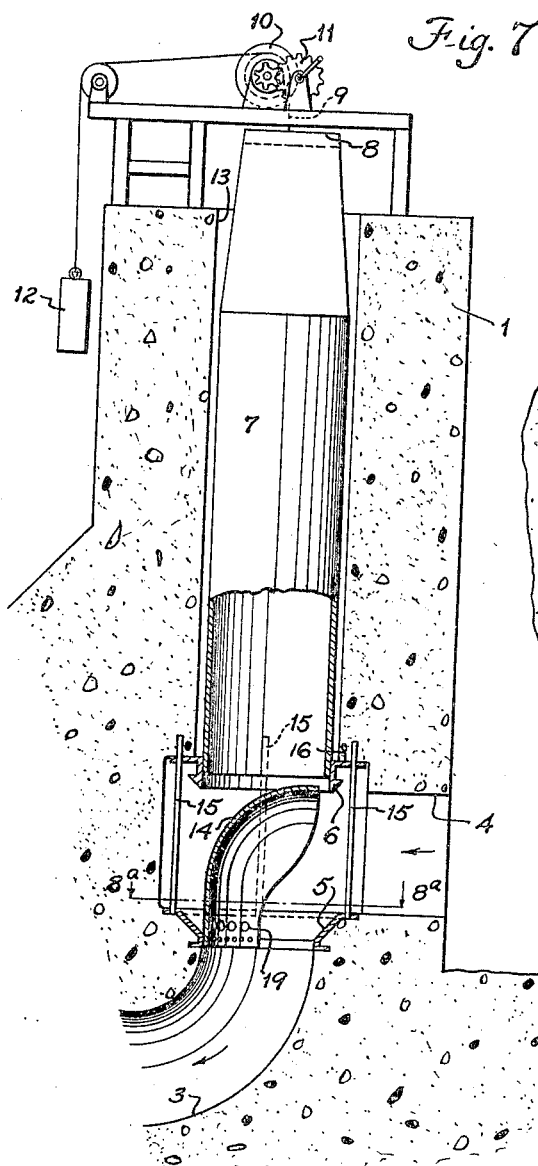
Figure 7 is a view of the gate shown in Figure 1 in raised position.
Figure 8:
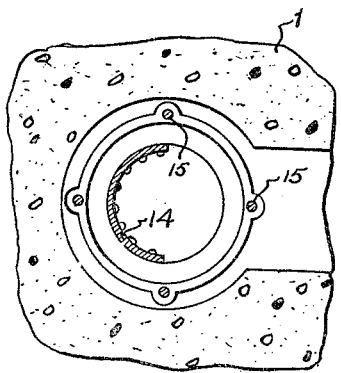
Figure 8 is a section on the line 8ª—8ª of Figure 7.

Referring to the drawings, 1 represents the wall of a reservoir containing water up to the level indicated at 2. Penstock 3 opens into the bottom of the reservoir, or at a point below water level 2, through a short intake conduit 4. The adjacent end portions of penstock 3 and conduit 4 are angularly disposed to one another, the former being more or less vertical and the latter more or less horizontal. Surrounding the intake end of penstock 3 is a valve seat 5, disposed in a substantially horizontal plane. Engaging valve seat 5 is the seating portion 6 of an elongated hollow or tubular gate member 7 extending upwardly above the water level and opening into the atmosphere at its upper end 8. Gate member 7 is raised and lowered by cable 9 running over winding drum 10 actuated by winch 11. Counterweight 12 may be connected to drum 10 to balance all or part of the dead weight of gate member 7.

Gate member 7 is maintained preferably within a well or recess 13 in masonry wall 1, both for protection and also to render it more accessible. Well 13 is of a sufficient diameter to provide annular clearance for gate member 7 down to valve seat 5, such clearance space communicating with conduit 4 and insuring balanced hydrostatic pressure on all sides of said gate member. Conduit 4 and said clearance space, are, so far as the effect of hydrostatic pressure is concerned, part of the reservoir itself. In fact, well 13 and conduit 4 are not necessary to the operation of the device if penstock 3 opens directly into the bottom of the reservoir proper, but such an arrangement is undesirable for reasons stated above.

Owing to the angularity between the adjacent end portions of penstock 3 and conduit 4, eddy losses and internal friction would attend the flow of any considerable volume of water, reducing the available head. To overcome this effect, a spherical deflector or baffle 14 is placed in the angular space between penstock 3 and conduit 4. Deflector 14 is provided with a plurality of vent holes 19 adjacent its base for distributing the effect of pressure or suction, and is continuous with penstock 3. It fits within and is enclosed by gate member 7 when the latter is seated, clearing the wall of well 13 adjacent conduit 4 by a sufficient space to permit gate member 7 to pass therebetween. There must also be sufficient clearance between deflector 14 and the interior of gate member 7, when the latter is in lowered position, to provide for communication of penstock 3 with the atmosphere through vent holes 19 and through the open end of said deflector.

Valve seat 5 may be conical, as shown in Figure 1, in which case gate member 7 is maintained in alignment with said valve seat by guide rods 15 embedded in the masonry of wall 1, ring 16 around gate member 7 being provided with holes or slots to slide over said guide rods. If desired, valve seats 5$^e$ and 5$^t$ and seating members 6$^e$ and 6$^t$ may be made spherical as shown in Figures 5 and 6, and guide rods 15 may then be dispensed with, as exact alignment is not necessary in such case.

In Figures 3 and 4 are shown forms of gate member which may be used in either of the arrangements shown in Figures 5 and 6, the forms there shown being likewise interchangeable. Where no positive seating force is desired, a gate member of cylindrical form may be employed. Gate member 7$^e$ may be stiffened by annular flanges 17.

In Figure 6 is shown a modified form of the device in which the intake end of conduit 3$^t$ is substantially horizontal and the adjacent end of conduit 4$^t$ is substantially vertical. In this case valve seat 5$^t$ surrounds the end of conduit 4$^t$ adjacent penstock 3$^t$. The interior of gate member 7$^t$ forms in effect a continuation of conduit 4$^t$, while the annular clearance space surrounding said gate member forms a continuation of penstock 3$^t$ whereby the latter communicates with the atmosphere. Gate member 7$^t$ is preferably cylindrical, as an inward taper would give rise to an unseating or buoyant tendency. Where a positive seating force is desired, it may be tapered outwardly, i. e., coned in reverse manner to the forms already shown. Deflector 14$^t$ is continuous with conduit 4$^t$ and is maintained within gate member 7$^t$ when the latter is seated. This modification is identical in principle with the preferred form of the invention, the only difference being in the reversal of direction of flow and in the selection of a suitable specific form of gate member 7$^t$.

It is desirable to connect the upper portion of well 13 with the main body of the reservoir by one or more passages 18 through the intervening portion of wall 1 slightly below the water level, to provide circulation and prevent freezing. The suction of penstock 3 when the gate is open will tend to increase such normal circulation and insure a constant change of water in well 3. The fact that the annular clearance space surrounding gate member 7 is of tapering section facilitates the removal of ice.

In the following claims, the term "penstock" is used to include intake conduit 4 as well as penstock 3 where the sense of the claim so requires.

What I claimed is:

1. In combination with a reservoir, a penstock leading from said reservoir below the water level thereof, a valve seat disposed in a substantially horizontal plane in said penstock, a wall having therein a well above said valve seat communicating with the atmosphere, an elongated valve member in said well having one end extending above the water level and the opposite end adapted to seat over said valve seat and thereby close said penstock, said valve member having a passage therethrough opening into the atmosphere and continuous with said penstock when the valve member is seated, there being an annular clearance space between said well and said gate member extending the full depth thereof, and means for seating and unseating said valve member.

2. In combination with a reservoir, a penstock leading from said reservoir below the water level thereof, a valve seat disposed in a substantially horizontal plane in said penstock, a wall having therein a well above said valve seat communicating with the atmosphere, an elongated valve member in said well having one end extending above the water level and the opposite end adapted to seat over said valve seat and thereby close said penstock, said valve member having a passage therethrough opening into the atmosphere and continuous with said penstock when the valve member is seated, there being an annular clearance space between said well and said gate member extending the full depth thereof, a baffle secured to said penstock for deflecting the stream into the opening surrounded by said valve seat, said baffle being covered by the valve member when the latter is seated, and means for seating and unseating said valve member.

3. In combination with a reservoir, a penstock leading from said reservoir below the water level thereof, a valve seat in said penstock, an elongated valve member having one end extending above the water level and the opposite end adapted to seat over said valve seat and close said penstock, said valve member having a passage therethrough opening into the atmosphere and continuous with said penstock when the valve member is seated, a baffle secured to said penstock for deflecting the stream into the opening surrounded by said valve seat, said baffle being covered by the valve member when the latter is seated, and means for seating and unseating said valve member.

4. The combination with a reservoir, of a penstock having an intake passageway leading from a side of said reservoir and having a bend therein, a wall forming a well above said bend, and a hollow tubular valve in said wall controlling the penstock at said bend, extending through the wall to above the water level in the reservoir, and spaced from the sides of said well, the interior of said valve communicating with the atmosphere to prevent the formation of a vacuum beneath said valve.

5. The combination with a reservoir, of a penstock connected with said reservoir below the water level and having a bend therein, a tubular valve controlling the penstock at said bend, a wall surrounding said valve but spaced therefrom and extending above the water level to form a well in which said valve is movable, and a passageway through said wall connecting the well with the reservoir to insure circulation of water in said well when the valve is open.

6. The combination with a penstock having a bend therein, of a hollow tubular valve controlling said penstock, and an arcuate baffle in said bend for deflecting a stream in a smooth path and over which said valve is adapted to slide and enclose the same.

7. A deflector for a penstock gate, comprising a baffle having substantially the contour of a portion of a spherical surface, one edge of said baffle being adapted to securing to a penstock opening, and having a plurality of vent holes adjacent said attaching edge.

Signed at New York city in the county of New York and State of New York this 2nd day of Feb. A. D. 1922.

CARL P. ASTROM.